(12) United States Patent
Lathrop et al.

(10) Patent No.: US 8,843,268 B2
(45) Date of Patent: Sep. 23, 2014

(54) MOTOR VEHICLE

(75) Inventors: William Brian Lathrop, San Jose, CA (US); Evan Small, Palo Alto, CA (US); Brian Michael Finn, East Palo Alto, CA (US); Deborah Garcia, legal representative, Freemont, CA (US)

(73) Assignee: Volkswagen AG, Wolfsburg (DE)

( * ) Notice: Subject to any disclaimer, the term of this patent is extended or adjusted under 35 U.S.C. 154(b) by 605 days.

(21) Appl. No.: 12/889,003

(22) Filed: Sep. 23, 2010
(Under 37 CFR 1.47)

(65) Prior Publication Data
US 2011/0040455 A1    Feb. 17, 2011

Related U.S. Application Data

(63) Continuation of application No. 12/699,689, filed on Feb. 3, 2010, now abandoned.

(60) Provisional application No. 61/149,523, filed on Feb. 3, 2009.

(51) Int. Cl.
| | |
|---|---|
| *B60K 37/00* | (2006.01) |
| *B62D 1/04* | (2006.01) |
| *G06F 3/041* | (2006.01) |
| *G06F 3/01* | (2006.01) |
| *B60K 35/00* | (2006.01) |
| *B60K 37/06* | (2006.01) |

(52) U.S. Cl.
CPC ......... *B62D 1/046* (2013.01); *B60K 2350/1028* (2013.01); *G06F 3/0414* (2013.01); *G06F 3/016* (2013.01); *B60K 35/00* (2013.01); *B60K 2350/1024* (2013.01); *G06F 3/041* (2013.01); *B60K 37/06* (2013.01); *B60K 2350/928* (2013.01)
USPC ............. 701/36; 345/173; 340/461; 340/438; 340/540; 340/462; 701/41; 701/49

(58) Field of Classification Search
USPC .................. 345/173, 156, 184, 30, 634, 641; 701/36, 1, 41, 42, 48; 340/438, 461, 340/462, 465, 575, 576, 665, 990, 995.15
See application file for complete search history.

(56) References Cited

U.S. PATENT DOCUMENTS

| | | |
|---|---|---|
| 5,270,689 A | 12/1993 | Hermann |
| 6,373,472 B1 * | 4/2002 | Palalau et al. ................. 345/173 |
| 2006/0146037 A1 | 7/2006 | Prados et al. |

FOREIGN PATENT DOCUMENTS

| | | |
|---|---|---|
| DE | 200 20 227 | 5/2001 |
| DE | 101 39 693 | 5/2002 |
| DE | 10 2009 023 447 | 1/2010 |
| EP | 0 366 132 | 5/1990 |

* cited by examiner

*Primary Examiner* — Adam Tissot
(74) *Attorney, Agent, or Firm* — Kenyon & Kenyon LLP

(57) ABSTRACT

The present invention relates to a motor vehicle having a steering wheel, the motor vehicle including a first display, integrated into the steering wheel, for the variable representation of information; a first touchscreen, situated over the first display, for the input of commands; a second display, integrated into the steering wheel and separated spatially from the first display, for the variable representation of information; and a second touchscreen, situated over the second display, for the input of commands.

13 Claims, 5 Drawing Sheets

MOTOR VEHICLE

CROSS-REFERENCE TO RELATED APPLICATIONS

The present application is a continuation of U.S. patent application Ser. No. 12/699,689, filed on Feb. 3, 2010, now abandoned which claims the benefit of U.S. Provisional Application No. 61/149,523, filed on Feb. 3, 2009, each of which is expressly incorporated herein in its entirety by reference thereto.

BACKGROUND INFORMATION

The present invention relates to a motor vehicle, having a steering wheel, having a display integrated into the steering wheel for the variable representation of information, and having a touchscreen, situated over the display, for the input of commands.

According to DE 101 39 693 A1, in the context of modern electronic devices in a vehicle that are constantly offering additional functions with more and more options, because of the limited installation space for the associated operating elements, multi-function operating elements have been created, by which various functions of the connected devices are operable. Thus, for example, EP 0 366 132 B1 describes a multi-function operating device for motor vehicles, where function groups and individual functions are selected with the aid of a rotary switch, and where an ENTER function can be triggered, one and the same bidirectional rotary switch being used for selecting menus and individual functions. This rotary switch has click-stop positions to which menus or individual functions are assigned, the ENTER function being able to be initiated by an axial motion of the rotary switch. Such a multi-function operating device is used, for example, to enter a destination into a navigation system. To that end, an alphanumeric keyboard is depicted on a display unit, the user being able to move forwards and backwards in the alphanumeric keyboard with the aid of the bidirectional motion of the rotary switch. When the cursor is located on the desired alphanumeric character, the character may then be selected by an axial motion of the rotary switch and transferred into the navigation system.

Moreover, it is known, for example, from U.S. 2006/0146037 A1 (incorporated by reference) to implement similar menu-driven operating concepts with the aid of touchscreens in a motor vehicle. U.S. 2006/0146037 A1 describes an input device for a motor vehicle, having a touchscreen for the input of commands by touching an operating surface or by pressing on the operating surface, an actuator for moving the touchscreen in at least one direction relative to a reference element, and an essentially U-shaped spring for the mechanical connection of the touchscreen to the reference element.

DE 200 20 227 U1 describes a vehicle steering wheel having two steering-wheel-mounted operating elements for controlling functions in a vehicle, each operating element including a touch-sensitive sensor surface which generates an electronic signal when touched.

The object of the present invention is to improve and simplify the operator control of a motor vehicle. In so doing, it is especially desirable that to the greatest extent possible, the driver not be distracted from the traffic situation, even when operating complex devices. In particular, operator control of a motor vehicle should be able to be accomplished very quickly.

SUMMARY OF THE PRESENT INVENTION

The aforesaid objective is achieved by a motor vehicle having a steering wheel, the motor vehicle including a first display, integrated into the steering wheel, for the variable representation of information; a first touchscreen, situated over the first display, for the input of commands; a second display, integrated into the steering wheel and separated spatially from the first display, for the variable representation of information; and a second touchscreen, situated over the second display, for the input of commands. A display for the variable representation of information within the meaning of the present invention is, in particular, a matrix display, a TFT [thin-film transistor] or similar.

In one form of the present invention, the first display is disposed in the left side area of the steering wheel. In so doing, provision is made in particular that no part of the first display is situated more than 15 cm from the edge of the steering wheel. In particular, the center of the first display is no more than 10 cm away from the edge of the steering wheel. In a further development of the present invention, the second display is disposed in the right side area of the steering wheel. In so doing, it is especially provided that no part of the second display is situated more than 15 cm from the edge of the steering wheel. In particular, the center of the second display is no more than 10 cm away from the edge of the steering wheel. In a further refinement of the present invention, the motor vehicle includes a display control for the coordinated control of the first display and the second display. To be understood by a coordinated control within the meaning of the present invention is, in particular, that information represented by the first display is connected as regards content with information represented by the second display.

In a further development of the present invention, the motor vehicle includes a first actuator for generating a haptic feedback when the first touchscreen is touched. In a further refinement of the present invention, the motor vehicle includes a second actuator for generating a haptic feedback when the second touchscreen is touched.

In addition, the aforesaid objective is achieved [by a] method for operating a motor vehicle, having a steering wheel; having a first display, integrated into the steering wheel, for the variable representation of information; having a first touchscreen, situated over the first display, for the input of commands; having a second display, integrated into the steering wheel and spatially separated from the first display, for the variable representation of information; and having a second touchscreen, situated over the second display, for the input of commands, first information being displayed by the first display and second information being displayed by the second display, In one form of the present invention, the first information is connected as regards content with the second information. In another form of the present invention, the second information includes a screen form for the operator control of a function of the motor vehicle. In a further development of the present invention, the first information includes a menu display superordinate to the screen form. In a further refinement of the present invention, the menu display has a visual reference to the display of the screen form.

Motor vehicle in terms of the present invention is, in particular, a land vehicle that may be used individually in road traffic. In particular, motor vehicles within the meaning of the present invention are not restricted to land vehicles having an internal combustion engine.

Further advantages and details are derived from the following description of exemplary embodiments.

DETAILED DESCRIPTION OF PREFERRED EXEMPLARY EMBODIMENTS

Figure 1:
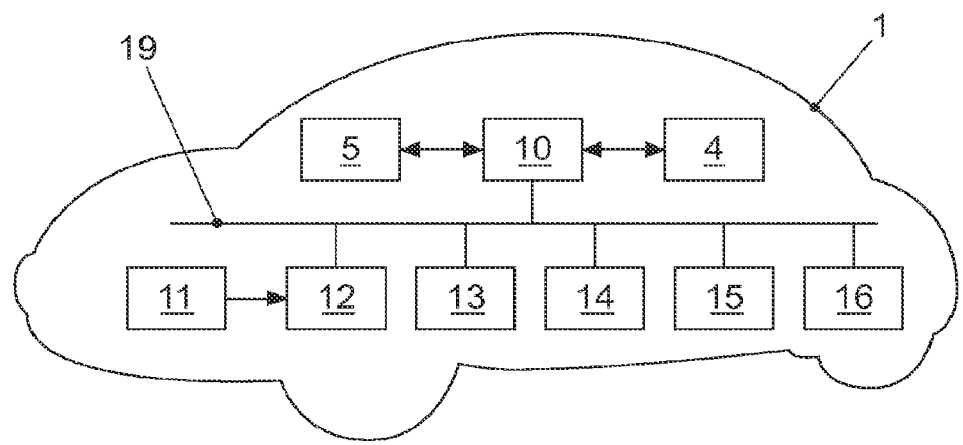
FIG. 1 shows an exemplary embodiment of a motor vehicle in a basic representation.
Figure 2:
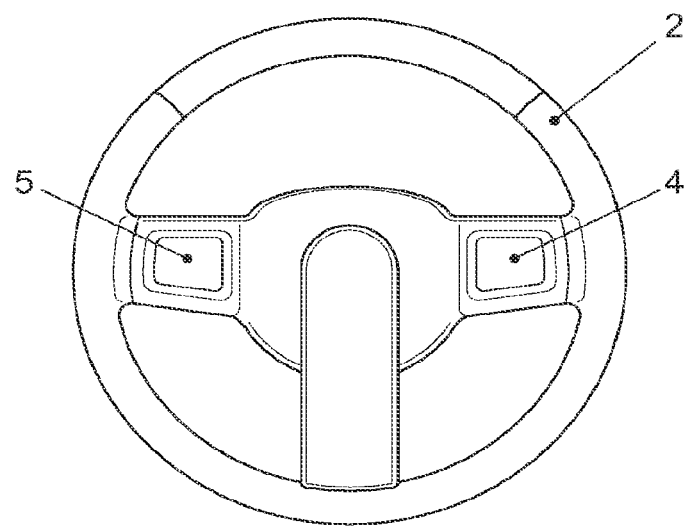
FIG. 2 shows an exemplary form of the steering wheel of the motor vehicle according to FIG. 1.

FIG. 1 shows a motor vehicle 1 in a basic representation. Motor vehicle 1 has a steering wheel 2, shown in FIG. 2, which includes a display and operating device 5 and a display and operating device 4, respectively, at its left and right edges. Display and operating devices 4 and 5 each include a display for the variable representation of information, as well as a touchscreen, disposed over the respective display, for the input of commands.

Motor vehicle 1 also includes a display control 10 for the coordinated control of display and operating device 4 with display and operating device 5. Display control 10 is connected by a bus system 19 to a Bluetooth interface 12, a navigation system 13, an automatic climate control 14, an infotainment system 15 and a vehicle control unit 16. For example, navigation system 13, automatic climate control 14, infotainment system 15, vehicle control unit 16 as well as—via Bluetooth interface 12—a mobile telephone 11 are operable with the aid of display and operating devices 4 and 5.

Figure 3:
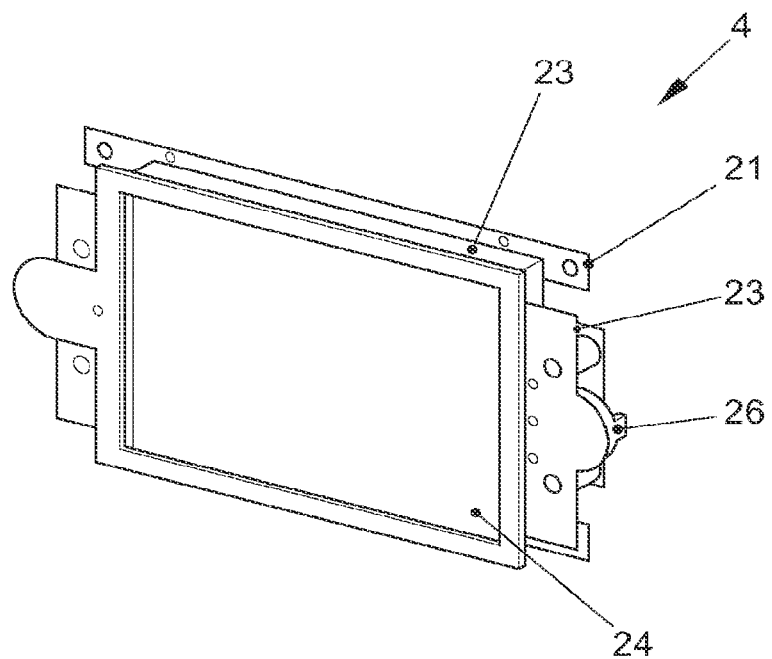
FIG. 3 shows an exemplary embodiment of a display and operating device in a perspective front view.
Figure 4:
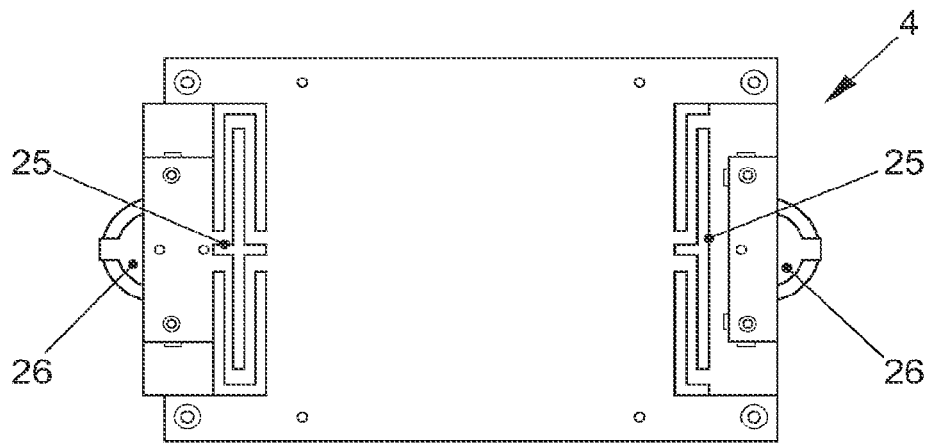
FIG. 4 shows a rear view of the display and operating device according to FIG. 3.
Figure 5:
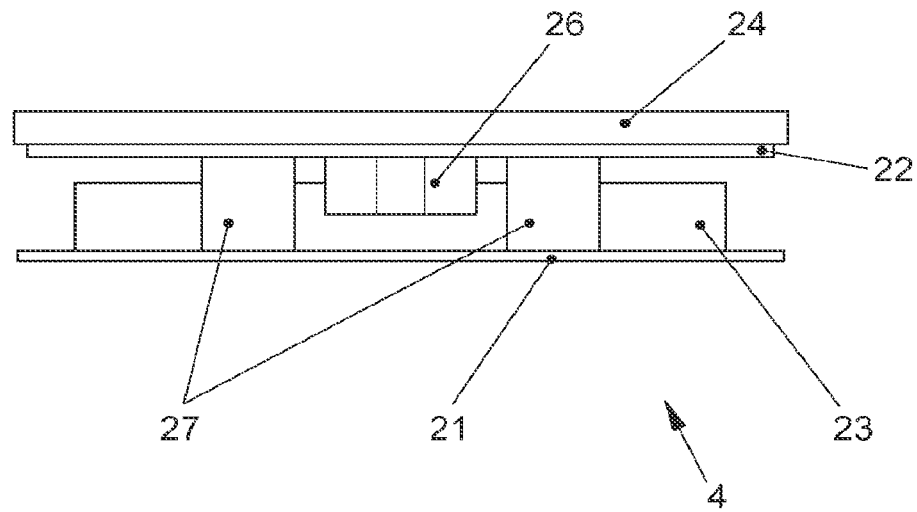
FIG. 5 shows a side view of the display and operating device according to FIG. 3.

For instance, display and operating devices 4 and 5 may be constructed according to the input device described in U.S. 2006/0146037 A1. However, display and operating devices 4 and 5 may also be modified—as shown, for instance, in FIG. 3, FIG. 4 and FIG. 5—compared to the input device described in U.S. 2006/0146037 A1. FIG. 3 shows display and operating device 4 in a perspective front view, FIG. 4 shows display and operating device 4 in a rear view, and FIG. 5 shows display and operating device 4 in a side view. Display and operating device 4 includes a touchscreen 24 disposed over a display 23. Touchscreen 24 is connected with the aid of a damper 22 to springs 25 as well as actuators 26 for generating a haptic feedback when touchscreen 24 is touched. In addition, display and operating device 4 includes fastening elements 27 by which damper 22 is joined to a mounting device 21. As discernible in FIG. 5, display 23 is also joined to mounting device 21. Display and operating device 5 may be implemented in the same manner.

Figure 6:
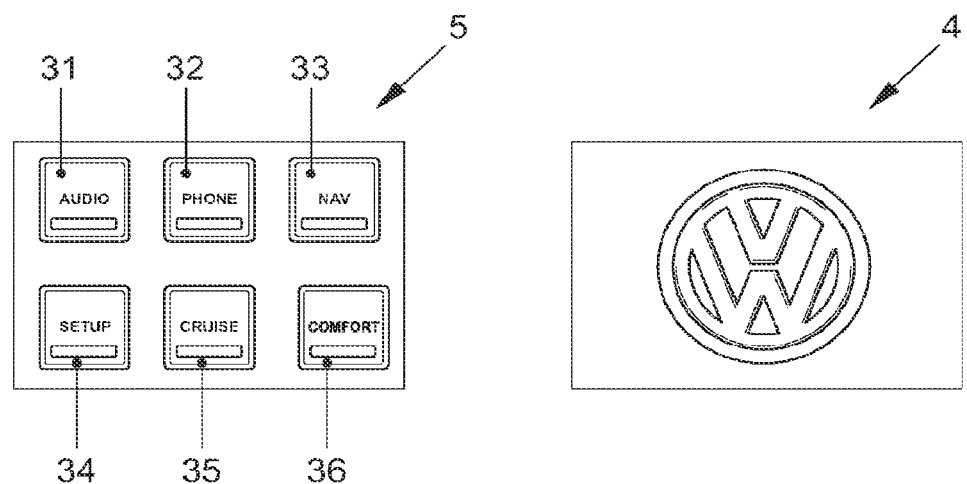
FIG. 6 shows an exemplary embodiment of a superordinate menu.

For the operator control of motor vehicle 1, that is, of functions of motor vehicle 1 like, for instance, navigation system 13, automatic climate control 14, infotainment system 15 or an adaptive cruise control which, for example, may be implemented in vehicle control unit 16, a superordinate menu is displayed by display and operating device 5, as shown by way of example in FIG. 6. The superordinate menu shown illustratively in FIG. 6 includes an operating element 31 for calling up a screen form for operating infotainment system 15, an operating element 32 for calling up a screen form for operating telephone 11, an operating element 33 for calling up a screen form for operating navigation system 13, an operating element 34 for calling up a screen form for altering the settings, an operating element 35 for calling up a screen form for operating the adaptive cruise control, as well as an operating element 36 for calling up a screen form for adjusting comfort settings.

Figure 7:
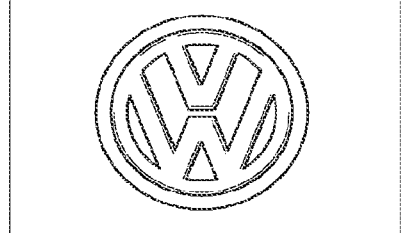
FIG. 7 shows an exemplary embodiment of an idle display.

If none of operating elements 31, 32, 33, 34, 35, 36 has been activated by touching touchscreen 24 at the corresponding location, this is indicated by representation of an idle display with the aid of display and operating device 4, as shown by way of example in FIG. 7.

Figures 8, 9:
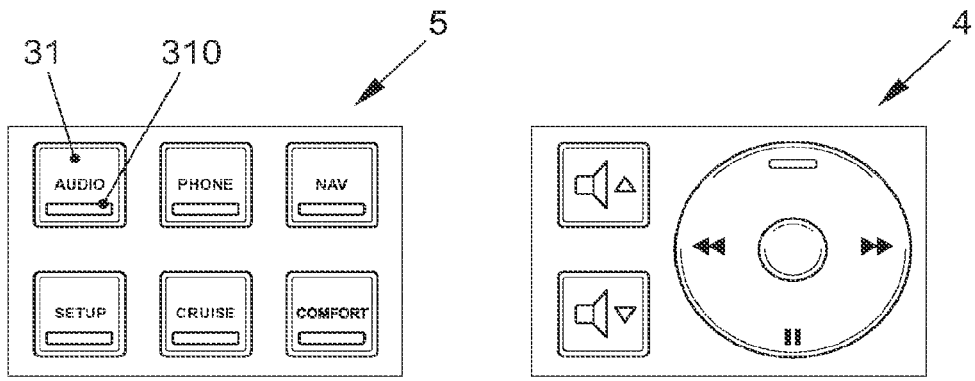
FIG. 8 shows a further exemplary embodiment of a superordinate menu.
FIG. 9 shows an exemplary embodiment of a screen form.

If touchscreen 24 is touched in the area of operating element 31, display and operating device 4 displays the screen form, shown in FIG. 9, for altering the audio settings. In the exemplary embodiment, it is provided that the touching of touchscreen 24 in the area of operating element 31—as shown in FIG. 8—is indicated by a bar 310 lighting up in operating element 31.

Figures 10, 11:
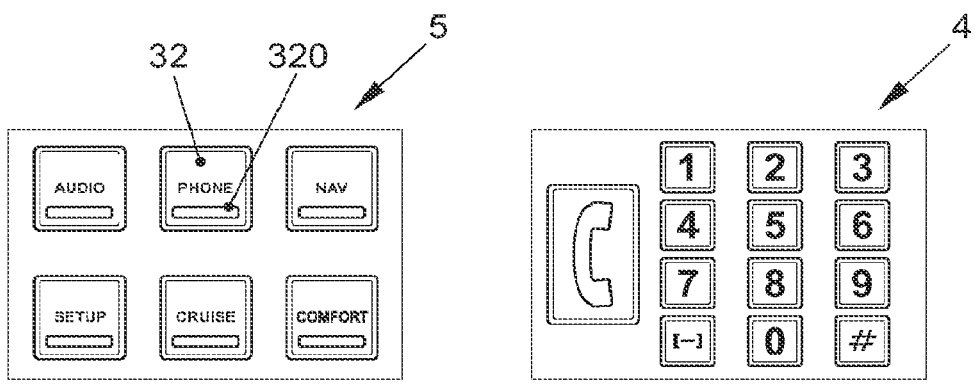
FIG. 10 shows a further exemplary embodiment of a superordinate menu.
FIG. 11 shows a further exemplary embodiment of a screen form.

If touchscreen 24 is touched in the area of operating element 32, display and operating device 4 displays the screen form, shown in FIG. 11, for operating telephone 11. In the exemplary embodiment, it is provided that the touching of touchscreen 24 in the area of operating element 32—as shown in FIG. 10—is indicated by a bar 320 lighting up in operating element 32.

Figures 12, 13:
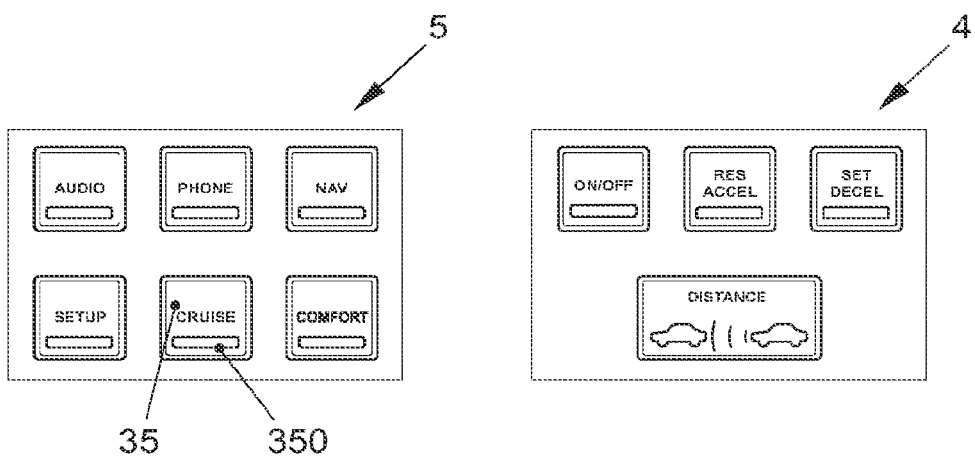
FIG. 12 shows a further exemplary embodiment of a superordinate menu.
FIG. 13 shows a further exemplary embodiment of a screen form.

If touchscreen 24 is touched in the area of operating element 35, display and operating device 4 displays the screen form, shown in FIG. 13, for operating the adaptive cruise control.

In the exemplary embodiment, it is provided that the touching of touchscreen 24 in the area of operating element 35—as shown in FIG. 12—is indicated by a bar 350 lighting up in operating element 35.

Figure 14:
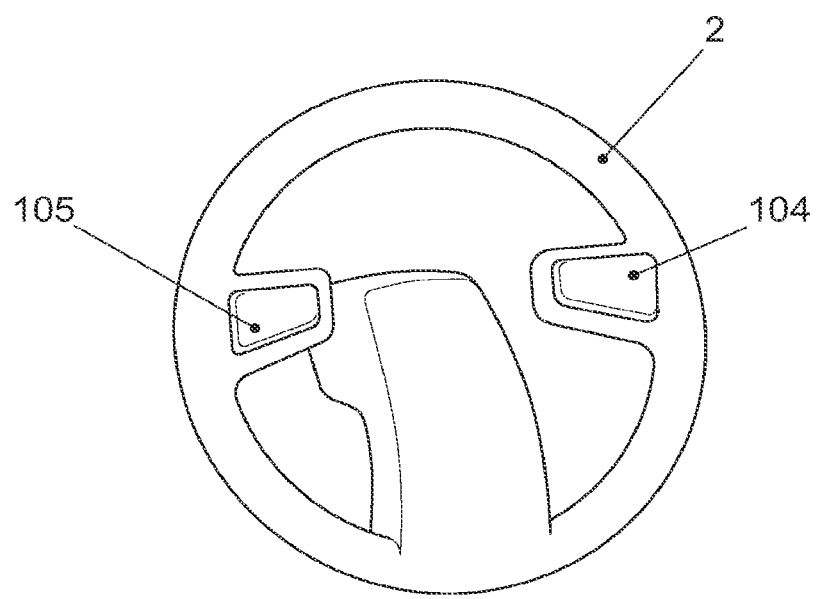
FIG. 14 shows a further exemplary embodiment of a steering wheel.

FIG. 14 shows an alternative form of a steering wheel 102. In this case, it may be provided that steering wheel 102 is used instead of steering wheel 2. Steering wheel 102 includes a display and operating device 104 corresponding to display and operating device 4, as well as a display and operating device 105 corresponding to display and operating device 5.

LIST OF REFERENCE NUMERALS 1 motor vehicle
2, 102 steering wheel
4, 5, 104, 105 display or [and] operating device
10 display control
11 mobile telephone
12 Bluetooth interface
13 navigation system
14 automatic climate control
15 infotainment system
16 vehicle control unit
19 bus system
21 mounting device
22 damper
23 display
24 touchscreen
25 spring 26 actuator
27 fastening elements
31, 32, 33, 34,
35, 36 operating element
310, 320, 350 bar

What is claimed is:

1. A motor vehicle, the motor vehicle comprising:
   a steering wheel;
   a first display, integrated into the steering wheel;
   a first touchscreen, situated over the first display, for the input of commands;
   a second display, integrated into the steering wheel and spatially separated from the first display, for the variable representation of information; and
   a second touchscreen, situated over the second display, for the input of commands;
   wherein the first display is only adapted to display a superordinate menu having at least one operating element to initiate display of the second information on the second display.

2. The motor vehicle as recited in claim 1, wherein the first display is disposed in the left side area of the steering wheel.

3. The motor vehicle as recited in claim 2, wherein the second display is disposed in the right side area of the steering wheel.

4. The motor vehicle as recited in claim 3, further including a display control for the coordinated control of the first display and the second display.

5. The motor vehicle as recited in claim 1, wherein the second display is disposed in the right side area of the steering wheel.

6. The motor vehicle as recited in claim 1, further including a display control for the coordinated control of the first display and the second display.

7. The motor vehicle as recited in claim 1, further including a first actuator for generating a haptic feedback when the first touchscreen is touched.

8. The motor vehicle as recited in claim 7, further including a second actuator for generating a haptic feedback when the second touchscreen is touched.

9. A method for operating a motor vehicle having a steering wheel; having a first display, integrated into the steering wheel; having a first touchscreen, situated over the first display, for the input of commands; having a second display, integrated into the steering wheel and spatially separated from the first display, for the variable representation of information; and having a second touchscreen, situated over the second display, for the input of commands, the method comprising:
   display of first information by the first display; and
   display of second information by the second display;
   wherein the first display only displays a superordinate menu having at least one operating element for initiating the display of the second information on the second display.

10. The method as recited in claim 9, wherein the first information is connected as regards content with the second information.

11. The method as recited in claim 9, wherein the second information includes a screen form for use by an operator to control a function of the motor vehicle.

12. The method as recited in claim 11, wherein the first information includes a menu display superordinate to the screen form.

13. The method as recited in claim 12, wherein the menu display has a visual reference to the display of the screen form.

* * * * *